United States Patent Office 3,483,882
Patented Dec. 16, 1969

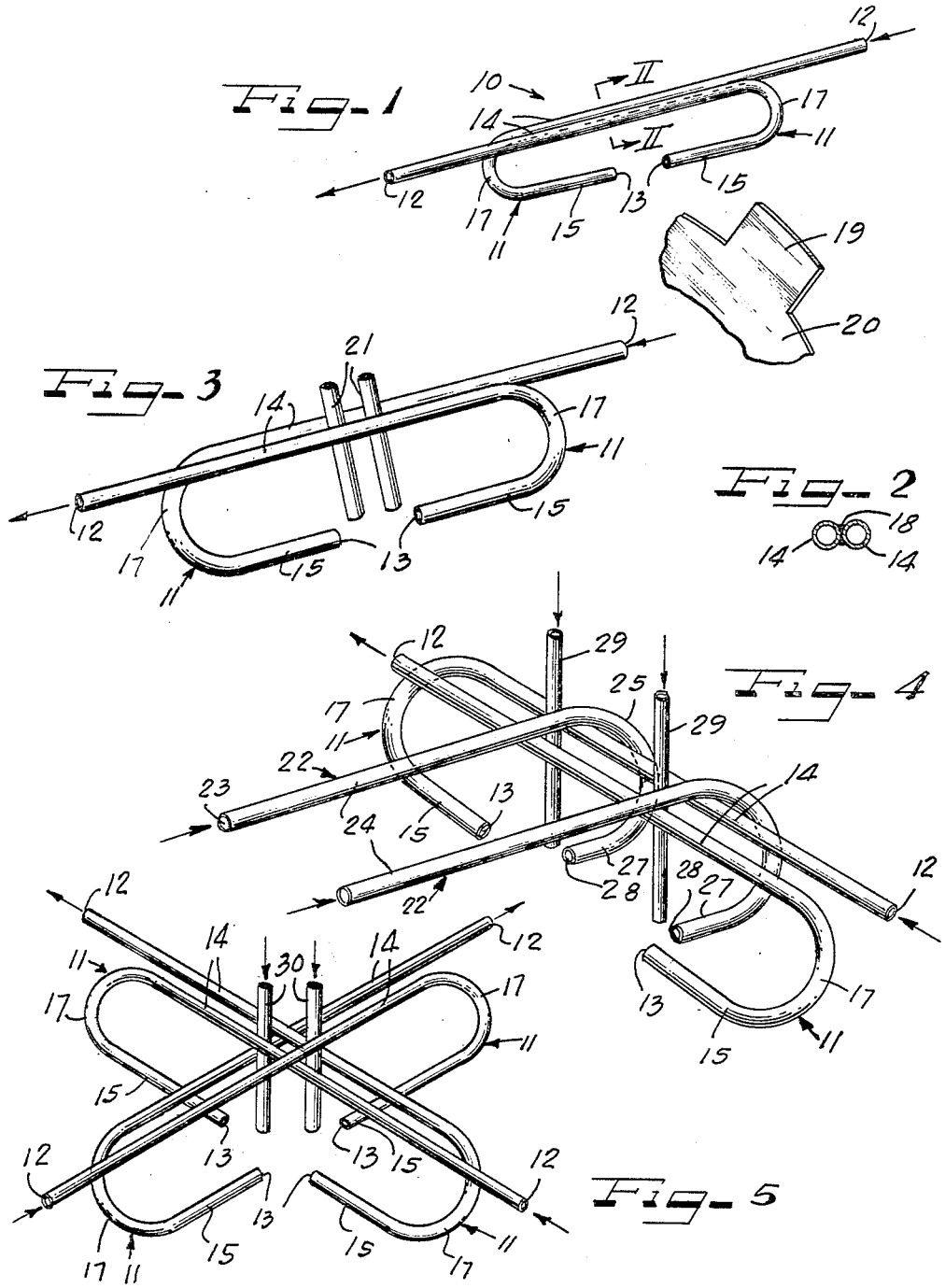

1

3,483,882
FLUIDIC DEVICES
Joseph S. Smith, Williamsville, N.Y., assignor to Houdaille Industries, Inc., Buffalo, N.Y., a corporation of Michigan
Filed Apr. 4, 1966, Ser. No. 540,068
Int. Cl. F15c 1/10
U.S. Cl. 137—81.5                            10 Claims

ABSTRACT OF THE DISCLOSURE

A fluidic device comprising a basic unit in which a pair of tubes, one serving as a fluid supply and the other serving as an output, have a substantially crook-shaped configuration in which the respective ends are directed in the same direction. Stem portions are fixedly connected together with the ends thereof extending oppositely, and with the second ends of the tubes providing orifices coaxially aligned in confronting relation spaced apart to provide a fluid transfer gap such that laminar flow from one of the orifices is received in the other of the orifices. Various control arrangements are adapted to employ the basic unit, such as AND gate and FLIP-FLOP circuits.

---

This invention relates to fluidic devices, and more particularly devices for use in fluid amplifier technology.

Recently there has been a rapid increase in the industrial application of fluidics (cf. The Spurt in Industrial Application of Fluidics, by E. J. Kompass, Control Engineering, January 1966). The fluid amplifiers employed in this art have the general attributes of simplicity, minimum or complete absence of moving parts, adaptability to hydraulic or pneumatic circuits, no wear-out problem, exceptional reliability, and adaptability to a wide range of uses. Although early development was primarily in the military field, including missile, rocket and jet engine controls, industrial uses are rapidly increasing, particularly in respect to digital logic circuits, machine tool controls, process controls, equipment controls, and the like. Some of the devices proposed have been reasonably simple, while others have been of some complexity in construction. Prior devices, however, have been deficient in various respects, of which may be mentioned requirement for special machinery or assembly techniques, multiplicity of parts, specialized moldings, etc.

An important object of the present invention is to simplify fluidic device structures and in other ways overcome the foregoing and other deficiencies in prior devices.

Another object of the invention is to provide novel fluidic device structure embodying a basic fluid tube configuration which lends itself to a wide variety of fluidic device permutations to perform numerous fluidic functions.

A further object of the invention is to provide a new fluidic device structure utilizing bent tubing.

Still another object of the invention is to provide a new fluidic device construction adapted in a single device to perform a logic function previously requiring a plurality of separate devices.

Other objects, features and advantages of the present invention will be readily apparent from the following detailed description of certain preferred embodiments thereof taken in conjunction with the accompanying drawing in which:

FIGURE 1 is an isometric view of a simple fluidic device embodying features of the invention;

FIGURE 2 is an enlarged fragmentary transverse sectional detail view taken substantially on the line II—II of FIGURE 1;

2

FIGURE 3 is an isometric view of a modification adapted for use as a switch in a NOR logic circuit;

FIGURE 4 is an isometric view of a device adapted to serve as a gate in an AND logic circuit; and FIGURE 5 is an isometric view of a device adapted to control a FLIP-FLOP circuit.

In FIGURE 1, a fluidic device 10 is shown which comprises simply two preferably identical preformed tubular members 11 made from any preferred gauge of tubing and of any preferred material metal or plastic. Each of the tubes 11 comprises a substantially crook-shaped configuration having a first end 12 and a second end 13. Including the first end 12 is a stem portion 14 and including the end 13 is a fluid transfer portion 15. Connecting the portions 14 and 15 is a curved portion 17. In a desirable construction, the stem portions 14 of the tube 11 are longer than the transfer portions 15. Both of the portions 14 and 15 are straight and parallel to one another and the curved connecting portion 17 provides a 180° bend, whereby the respective open ends 12 and 13 of each of the tubes 11 are directed in the same direction.

In the assembly, the fluid conducting tubes 11 are fixedly secured together to provide a unitary device in which one of the tubes serves as a fluid supply tube and the other of the tubes serves as an output tube, with the respective ends 12 projecting in opposite directions and the ends 13 of the tubes coaxially aligned in confronting relation spaced apart to provide a fluid transfer gap. Desirably this is effected in a manner to unite the tubes 11 into a unitary structure. This can be easily done by securing the stem portions 14 fixedly together as by means of solder, brazing, welding where the tubes are metal, and by means of fusing, bonding, cementing in the case of plastic tubing, any of which is referred to at 18 in FIGURE 2. Through this arrangement, the resulting unit fluidic device is adapted to be connected into a circuit to be controlled with either of the tubes 11 serving as the supply tube and the other as the output tube.

Fluid entering one of the tubes 11 through its open end 12, as indicated by directional arrow passes through the tube and issues from its opposite open end as a discharge orifice with the fluid stream emerging in a condition of laminar flow. At least a substantial percentage of the fluid stream or jet, depending upon the length of the transfer gap between the confronting ends 13 enters the receiving orifice defined by the end 13 of the output tube and passes through the output tube and is discharged from its end 12. Such fluid transfer across the transfer gap continues uninterruptedly as long as the supply is maintained, unless modified or stopped as by means of control device or interrupter, typified by at least one interrupting lug or ear 19 on a carrier 20 such as a rotary disc which may cause the interrupter lug to enter the jet gap and stop the fluid transfer for a predetermined interval in a control sequence, or the like.

In the switch device of FIGURE 3, especially suitable for NOR circuits, the same basic relationship of the tubes 11 is adhered to, but the assembly includes at least one, and in this instance two, modulating control or input tubes 21. One of these tubes 21 has its jet discharge end aimed across the jet gap adjacent to one of the orifice ends 13 and the other of the tubes 21 has its discharge jet end aimed across the jet transfer gap adjacent to the other of the end orifices 13. By intercepting and modulating the airstream or laminar transfer jet by means of either or both of the control tubes 21, desirable variations in the stream issuing from the output tube are obtainable. Integration of the control tubes 21 in the unit may be effected by fixedly securing them to and between the stem portions 14, and in this instance serving as part of the connecting means securing the tubes 11 in the assembly.

In FIGURE 4, orientation of the tubes 11 is the same as in FIGURE 1, but for AND gate operation a pair of control tubes 22 of generally crook-shape, and which may be substantially counterparts of or even duplicates of the tubes 11, are provided. Each of the tubes 22 has an inlet opening end 23 into an elongated stem 24 which is joined by a curved portion 25 to a fluid discharge portion 27 having a discharge orifice 28. One of the tubes 22 is located with its discharge portion 27 adjacent to one of the orifices 13 with the axes of the orifices intersecting, and the other of the tubes 22 has its orifice 29 adjacent to the other orifice 13 and with the axes of these orifices intersecting. By continuous fluid supply to the tubes 22, the jet streams issuing from the orifices 28 thereof will completely interrupt the laminar stream between the orifices 13. However, a respective control tube 29 has its orifice discharge end adjacent to and with its axis intersecting the axis of the associated orifice 28 between the orifice 28 and the jet stream axis between the orifices 13. Thereby the control jets issuing from the orifices 28 are controllable by modification or cancellation by suitable operation of the circuits through the control tubes 29. In this instance, the tubes 22 and 29 are suitably secured fixedly to the stem portions 14 and serve as part of the means for securing the tubes 11 in unitary device fashion.

For FLIP-FLOP circuit control, the device of FIGURE 5 is indicated. In this device two sets of switch components are secured in a single unit and so related that normally the laminar jets across the transfer gaps cancel one another, so that by modulating, blocking or diverting either of the transfer streams or jets selectively, the other functions to complete circuit flow through its output tube. For this purpose, a second set of the supply-output tubes 11 is mounted in respect to the first set with the respective jet stream transfer gaps between the respective confronting orifices 13 intersecting at a center between the sets of orifices whereby the transfer jet streams are turbulently cancelled, or at least normally substantially modified, depending upon the velocity of the respective transfer jet streams. In control of each of the transfer jet streams is a respective control tube 30 located adjacent to the respective discharge orifice 13 of the supply tube of the associated switch tube jet and with the control tube orifice axis intersecting the transfer jet stream. Through this arrangement, the respective control tubes are selectively (or alternatively) operative to modify or cancel the associated transfer jet stream so that the remaining transfer jet stream will be active in its output tube.

It will be appreciated, of course, that the specific examples given have been exemplary of numerous and varied fluidic device units for performing desired logic functions and other fluidic control operations.

It will be understood that various modifications may be effected without departing from the spirit and scope of the novel concepts of this invention.

I claim as my invention:

1. A fluidic device of the character described comprising:
    a pair of tubes, one of which serves as a fluid supply tube and the other of which serves as an output tube;
    each of said tubes comprising a substantially crook-shaped configuration having a first open end and a second open end, a stem portion including said first end, and a fluid transfer portion including said second end, said portions being joined by a curved portion so that said ends are directed in the same direction;
    and means fixedly connecting said stem portions in side-by-side relation with said first ends extending oppositely and with said second ends providing orifices coaxially aligned in confronting relation spaced apart to provide a fluid transfer jet gap therebetween, one of said orifices being constructed to discharge a fluid stream in a condition of laminar flow and the other orifice serving as a receiving orifice and being dimensioned and so spaced from the discharge orifice that at least a substantial part of the fluid stream from the discharge orifice enters the receiving orifice.

2. A fluidic device as defined in claim 1, including in combination therewith, means for interrupting passage of fluid between said orifices.

3. A device as defined in claim 1, including in combination therewith, means attached to said stem portions for modulating transfer of fluid between said orifices.

4. The combination of claim 3, in which said modulated means comprises at least one control tube having a discharge end adjacent to one of said orifices and on an axis intersecting the orifice axis.

5. The combination of claim 3, wherein said modulating means comprise a pair of control tubes mounted between said stem portions.

6. A fluidic device as defined in claim 1, including in combination therewith, means enabling the device to serve as an AND gate and comprising respective generally crook-shaped control tubes attached to said stems and having respective discharge orifices adjacent to the respective fluid transfer orifices and with the discharge orifice axes intersecting the transfer orifice axis, and control tubes also attached to said stem portions and having discharge ends respectively controllingly directed across the axes of the discharge orifices of the crook-shaped control tubes.

7. The combination of claim 6, in which said crook-shaped control tubes have curved portions extending around the stem portions.

8. The combination of claim 6, in which said last mentioned control tubes are located between said stem portions and connected thereto.

9. A fluidic device as defined in claim 1, including in combination therewith, a second pair of tubes having the same features as the first mentioned pair of tubes and with the stem portions of the two pairs of tubes crossingly related and connected together and the fluid transfer jet gaps defined between the orifices thereof intersectingly related, and control tubes fixedly connected to said crossingly related stem portions and having respective discharge ends directed in modulating relation across the respective gaps, whereby to enable the combination to be used as a unit in a FLIP-FLOP circuit.

10. The combination of claim 9, in which said control tubes are located between the stem portions of the respectively other of the pairs of tubes from that pair across the transfer gap of which the respective tube is directed to discharge.

References Cited

UNITED STATES PATENTS

| | | | |
|---|---|---|---|
| 3,234,955 | 2/1966 | Auger | 137—81.5 |
| 3,352,267 | 11/1967 | Brandriff et al. | 137—81.5 |

FOREIGN PATENTS

| | | |
|---|---|---|
| 1,347,426 | 11/1963 | France. |
| 1,361,162 | 4/1964 | France. |

M. CARY NELSON, Primary Examiner

W. R. CLINE, Assistant Examiner